United States Patent [19]
Cheng

[11] Patent Number: 5,850,493
[45] Date of Patent: Dec. 15, 1998

[54] DEVICE FOR FOCUSING LIGHT THROUGH AN OPTICAL COMPONENT

[76] Inventor: Yihao Cheng, 36 Meadowbreeze Drive, Kanata, Ontario, Canada, K2M 2L6

[21] Appl. No.: 896,540

[22] Filed: Jul. 18, 1997

[51] Int. Cl.⁶ .................................................... G02B 6/32
[52] U.S. Cl. ................................................................ 385/34
[58] Field of Search ................................ 385/27, 31, 32, 385/33, 34, 35, 39, 51, 74, 147

[56] References Cited

U.S. PATENT DOCUMENTS

| | | | |
|---|---|---|---|
| 4,946,239 | 8/1990 | Garmon | 385/43 |
| 5,117,473 | 5/1992 | Pan | 385/33 |
| 5,177,803 | 1/1993 | Newhouse et al. | 385/33 |
| 5,371,816 | 12/1994 | Pan | 385/33 |
| 5,546,180 | 8/1996 | Garel-Jones et al. | 356/73.1 |
| 5,719,973 | 2/1998 | Monroe et al. | 385/34 |

*Primary Examiner*—Akm E. Ullah
*Attorney, Agent, or Firm*—Neil Teitelbaum & Associates

[57] ABSTRACT

An optical device comprising an optical element optically coupled with at least two lenses, each lens having at least a substantially collimating end, the at least substantially collimating ends being inwardly facing one another and each lens having a substantially focusing end, the substantially focusing ends being outwardly facing, and at least one waveguide disposed adjacent and spaced from the each outwardly facing end for coupling light to or from an adjacent lens, the waveguides each having an end that is separated from its adjacent lens by an optical distance of approximately d1, an optical distance between the two collimating end faces of the at least two lenses being d2, where d1 is approximately equal to one half d2.

20 Claims, 4 Drawing Sheets

DEVICE FOR FOCUSING LIGHT THROUGH AN OPTICAL COMPONENT

FIELD OF THE INVENTION

This invention relates generally to optical devices that use lenses for collimating and focusing light therethrough, and more particularly for a device that utilizes these lenses to provide a suitable beam for use in combination with another optical component.

BACKGROUND OF THE INVENTION

Currently lenses of various types are used to collimate a diverging light beam exiting an optical waveguide and to focus light that being launched into an optical waveguide so as to more efficiently couple the light.

One of the most ubiquitous building blocks used in the design and manufacture of optical elements is the graded index (GRIN) lens. Lenses of this type are produced under the trade name "SELFOC"; the mark is registered in Japan and owned by the Nippon Sheet and Glass Co. Ltd. GRIN lenses in combination with other optical elements are used in the manufacture of WDM devices, optical couplers, circulators, isolators, and other devices. The use of a GRIN lens in this invention provides a number of advantages over other conventional lenses, however does not limit the invention to only GRIN lenses.

Advantages of GRIN lenses are that they are relatively inexpensive, compact, and furthermore have parallel flat end faces. In particular, the flat end face of the GRIN lens allows a single lens to be used as a means of collimating or focusing the light, and as well, as a means of tapping light reflected from the end face of the lens.

Quarter pitch focusing/collimating GRIN lenses are known to be used having their collimating ends adjacent one another in a back to back relationship, and having a thin optical element such as a dichroic thin film filter sandwiched therebetween. Such an arrangement may serve as a multiplexing/dempultiplexing optical filter. One or more optical fibers are typically coupled to an input end and to an output end (outwardly facing ends of the lenses) of the device. For these filters to work efficiently, without high coupling losses, it is especially important for the dichoric element disposed between the two lenses to be very thin.

When two quarter pitch GRIN lenses are placed directly adjacent one another with their collimating ends coupled, light launched into the input end from an input optical fiber having its optical axis parallel to but offset with the optical axis of the GRIN lens is directed to a location at the output end of the second GRIN lens. The light leaving the second lens is directly coupled into an output fibre that is parallel with the optical axis and the input optical fibre but offset thereto. However, if the lenses are unduly spaced, light exiting the output (focusing) end exits at an angle to the optical axis of the lens and is difficult to couple to a waveguide, for example to an optical fibre that does not have its optical axis parallel with the optical axis of the lens. This is a particular problem when a relatively thick optical element such as an isolator is disposed adjacent to a GRIN lens.

This invention obviates this difficulty, by providing a lens arrangement that is compatible with a relatively thin or thick optical element disposed between input and output waveguides.

SUMMARY OF THE INVENTION

In accordance with the invention there is provided, an optical device comprising, an optical element optically coupled with at least two lenses, each lens having at least a substantially collimating end, the at least substantially collimating ends being inwardly facing one another and each lens having a substantially focusing end, the substantially focusing ends being outwardly facing, and at least one waveguide disposed adjacent and spaced from the each outwardly facing end for coupling light to or from an adjacent lens, the waveguides each having an end that is separated from its adjacent lens by an optical distance of approximately d1, an optical distance between the two collimating end faces of the at least two lenses being d2, where d1 is approximately equal to one half of d2.

In accordance with the invention, there is further provided, an optical device comprising:

two lenses, each having an at least substantially collimating end face and a substantially focusing end face;

an optical element coupled with at least one of the two lenses;

a waveguide adjacent to and spaced from each of the two lenses for launching light to or from a respective adjacent lens, the waveguides each having an end that is separated from its adjacent lens by an optical distance of approximately d1, an optical distance between the two substantially collimating end faces of the at least two lenses being d2, where d1 is approximately equal to one half of d2, and wherein d1>0.

In accordance with the invention, there is further provided, an optical arrangement device an input waveguide having an input end face, an output waveguide having an output end face, a first GRIN lens, a second GRIN lens, the input end face of the waveguide facing and being spaced an optical distance $d_1$ from the first GRIN lens, and the end face of the output waveguide facing and being spaced an optical distance $d_2$ from the second GRIN lens, the first and second GRIN lenses being spaced apart such that the optical distance between inwardly facing faces of the first and second GRIN lenses is approximately equal to $d_1+d_2$.

This invention advantageously, provides an arrangement of lenses and input/output waveguides that allows an relatively thick optical element to be disposed therebetween, and while allowing the input/output waveguides to remain parallel to one another while efficiently coupling light with no more than minimal coupling loss.

BRIEF DESCRIPTION OF THE DRAWINGS

Exemplary embodiments of the invention will now be described in conjunction with the drawings, in which.

DETAILED DESCRIPTION

Figure 1A:
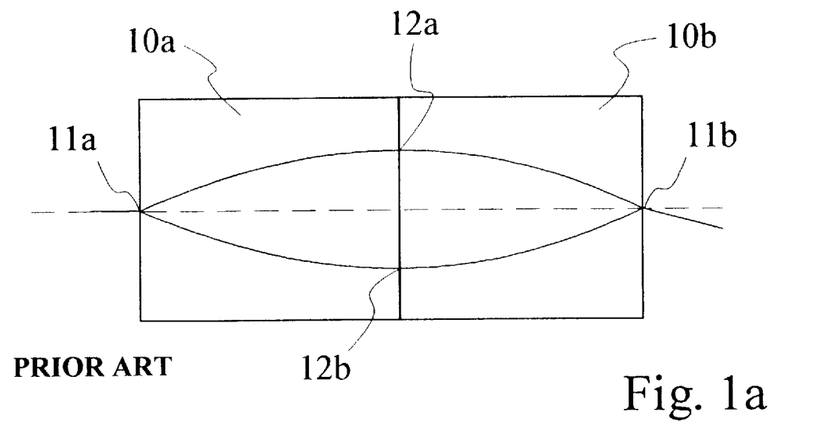
FIG. 1a is a side view of a prior art arrangement of a pair of back to back quarter pitch GRIN lenses having input/output waveguides positioned along the optical axes of the lenses.

Turning now to FIG. 1a, a pair of quarter pitch GRIN lenses 10a and 10b are shown having their collimating ends inwardly facing and their focusing ends outwardly facing. Two optical waveguides 11a and 11b are shown coaxial with and coupled to the lenses along at the optical axis of the lenses 10a and 10b shown by a dotted line. A beam profile is also shown within the lenses 10a and 10b as if light was launched from one of the waveguides 11a and 11b to a respective lens. It should be noted that the beam profile at the interface between the two lenses extends to a circumference about the lens indicated by points 12a and 12b, being two points on the circumference.

Figure 1B:
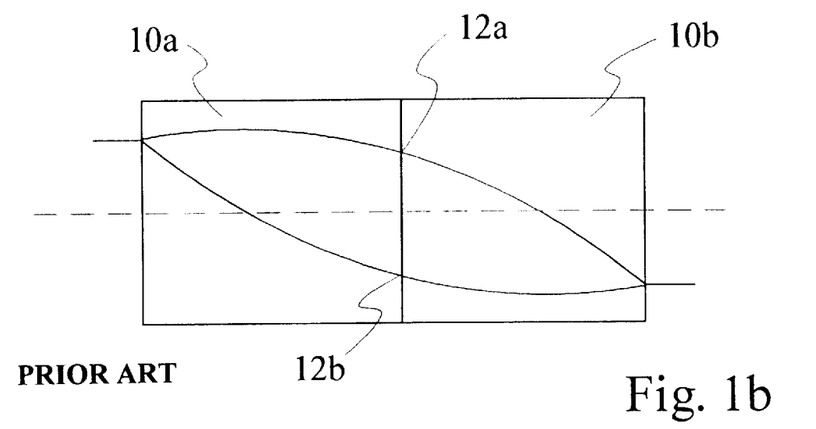
FIG. 1b is a side view of a prior art arrangement of a pair of back to back quarter pitch GRIN lenses having input/output waveguides positioned offset from the optical axes of the lenses.

FIG. 1b illustrates the same pair of GRIN lenses as in FIG. 1a, however the two optical waveguides 11a and 11b are shown to be offset a same optical distance from the common optical axis of the lenses 10a and 10b. Here, the beam profile at the interface between the two lenses extends to the same circumference as in FIG. 1a, however the angle of the beam has varied. By ensuring that there is no separation between the two lenses, and that the optical waveguides are directly coupled with respective lenses, light is most effectively coupled from one waveguide 11a into the other 11b (or vice versa) when the waveguides are parallel to the common optical axis shared by the lenses. A similar arrangement is shown in FIG. 1c, wherein input/output waveguides 11a and 11b are disposed on opposite sides of the optical axis of the lens, from that in FIG. FIG. 1b.

Figure 1C:
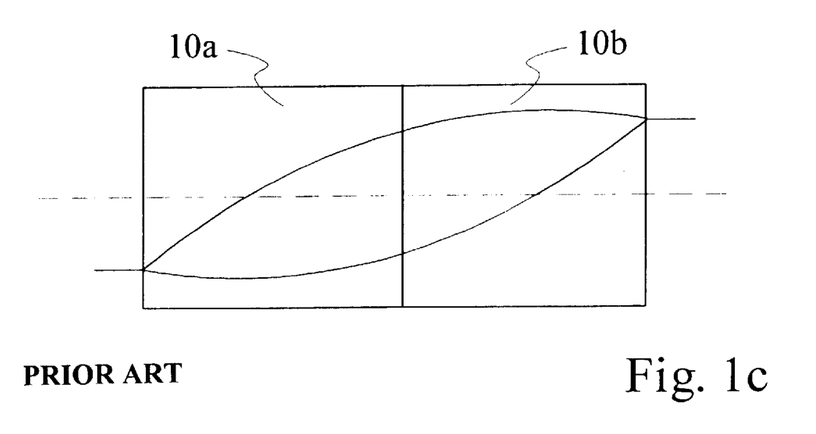
FIG. 1c is a side view of a prior art arrangement of a pair of back to back quarter pitch GRIN lenses having input/output waveguides positioned offset from the optical axes of the lenses.
Figure 2A:
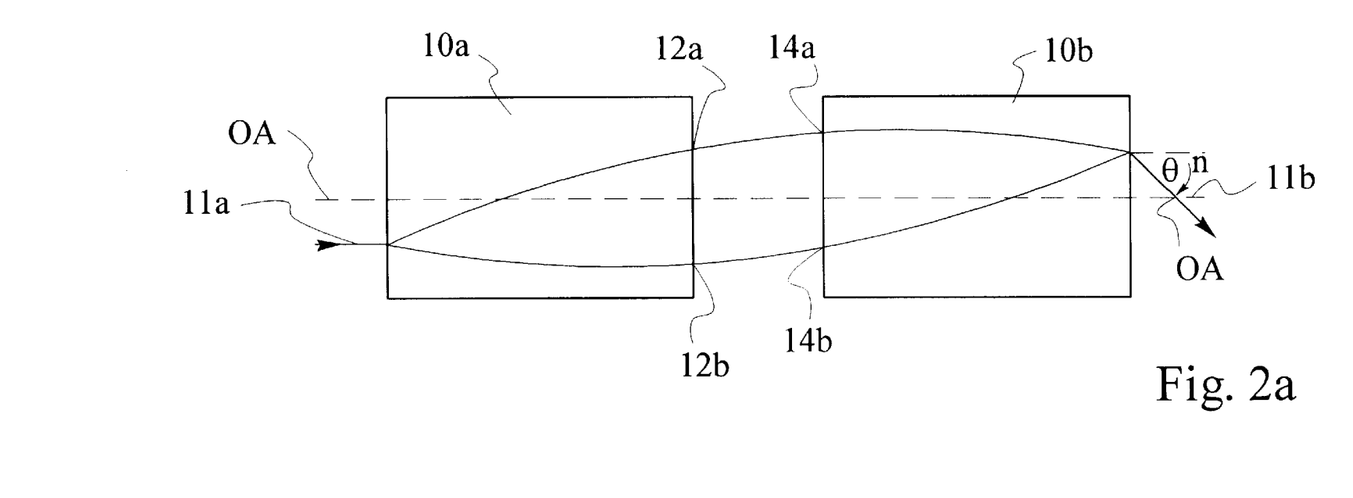
FIG. 2a is a side view of an arrangement of a pair of back to back spaced GRIN lenses having input/output waveguides positioned offset from the optical axes of the lenses; and, FIG. 2b is a side view of an arrangement of a pair of back to back spaced GRIN lenses having input/output waveguides positioned offset from the optical axes of the lenses in accordance with this invention.

Referring now to FIG. 2a, the lenses shown in FIG. 1c are now spaced apart a fixed distance. The optical axis of the waveguide 11 is shown to be parallel to the optical axis OA of the lens 10a. However, in order to efficiently couple light from the output waveguide 11b, it must be non-parallel to the input waveguide 11a and at an angle θ with respect to the optical axis of the lens 10b, dependent upon the amount of separation. Essentially as the separation increases between the two lenses, the output beam diverges from the optical axis of lens 10b.

Figure 2B:
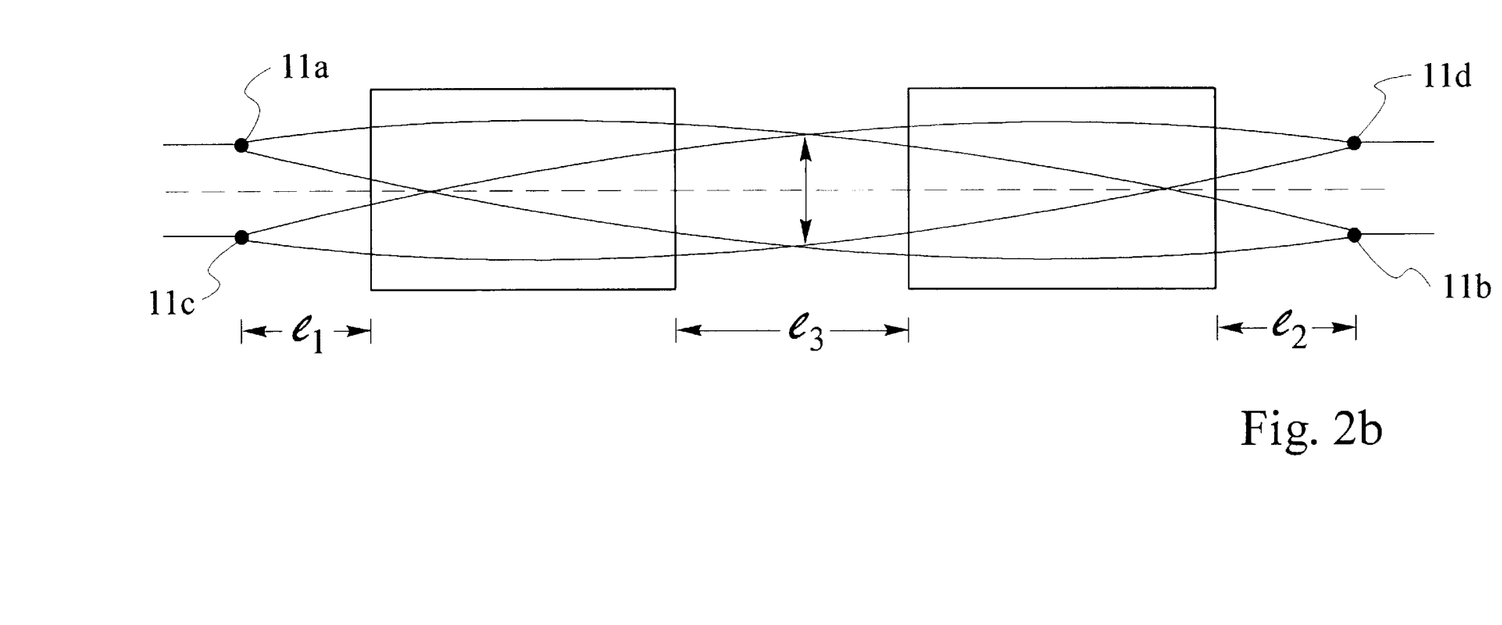

In accordance with this invention, and as is shown in FIG. 2b, light can efficiently be coupled from an input waveguide to an output waveguide that are both substantially parallel with an optical axis of one of the lenses 10a or 10b by ensuring that the spacing of the input waveguides and the spacing between adjacent lenses is within a predetermined ratio. More particularly, the lenses 10a and 10b shown in FIG. 2b are spaced an optical distance $l_3$. The input waveguides 11a and 11c are an optical distance $l_1$ from the end face of the lens 10a. The output waveguides 11b and 11d are an optical distance $l_2$ from their adjacent lens 10b.

For optimum coupling to exist, and for the input and optical waveguides to have their optical axes parallel with the optical axis of the coaxial lenses, the following relationship should exist: $l_1 \approx l_2 \approx 0.5 l_3$.

Figure 3:
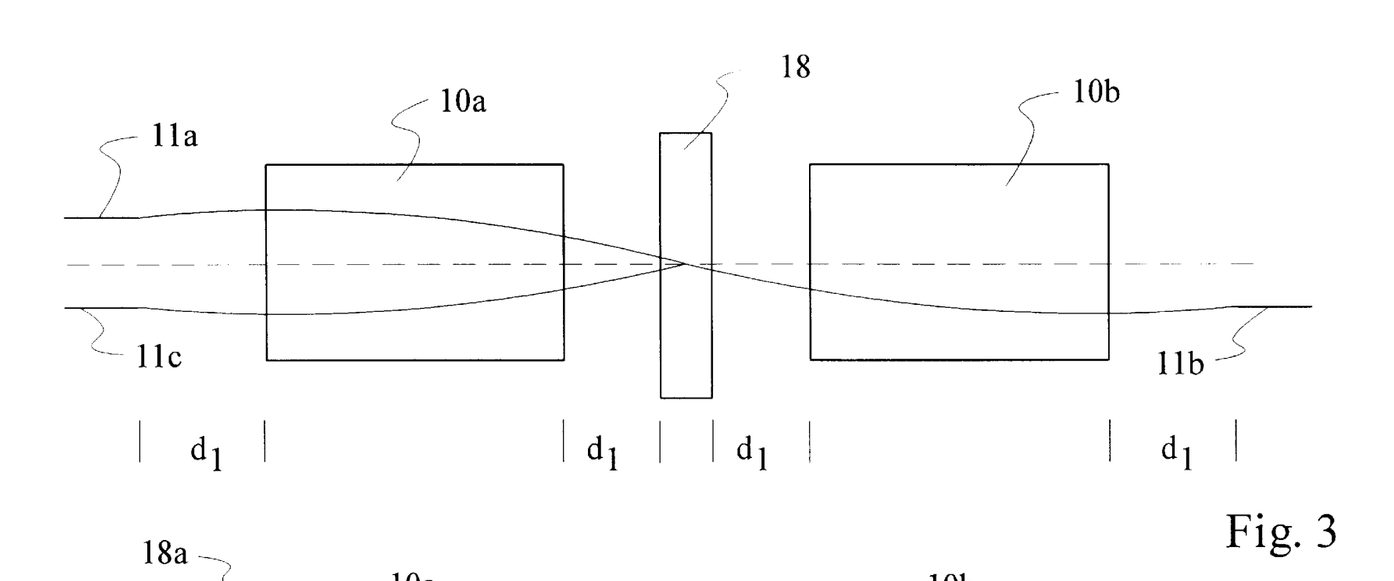
FIG. 3 is a side view of an arrangement of a pair of back to back spaced GRIN lenses having input/output waveguides positioned offset from the optical axes of the lenses an including an optical element disposed between the lenses, in accordance with this invention.

Referring now to FIG. 3, an optical arrangement is shown, wherein two focusing/collimating lenses 10a and 10b are shown having their collimating ends facing inward. The space between the lenses is 2d. Input waveguides 11a, 11c and output waveguide 11b are shown spaced an optical distance d from their adjacent lens. An optical element in the form of an optical filter is shown disposed between the lenses. Conveniently, this invention provides an arrangement of elements that allows a relatively thick optical element to be disposed between the two waveguides, and in this instance between the two lenses.

Figure 4:
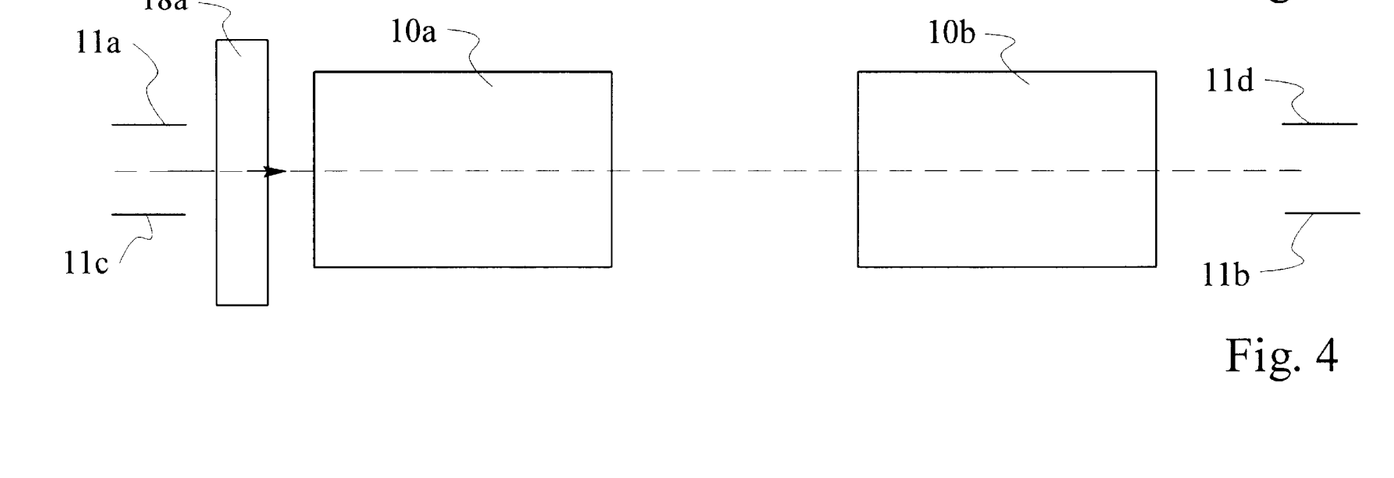
FIG. 4 is a side view of an arrangement of a pair of back to back spaced GRIN lenses having input/output waveguides positioned offset from the optical axes of the lenses an including an optical element disposed between one of the lenses and input waveguides, in accordance with this invention.

FIG. 4 is similar to FIG. 3 however, the optical element 18a shown in FIG. 4 to be an optical isolator is disposed between the input/output waveguides in the form of optical fibers. Conveniently optical fiber 11a is coupled with 11b through the isolator and fibers 11c and 11d are optically coupled through the same isolator. By sharing an isolating element in this manner, the cost of providing two physically separate isolators is obviated thereby reducing the overall manufacturing cost.

Figure 5:
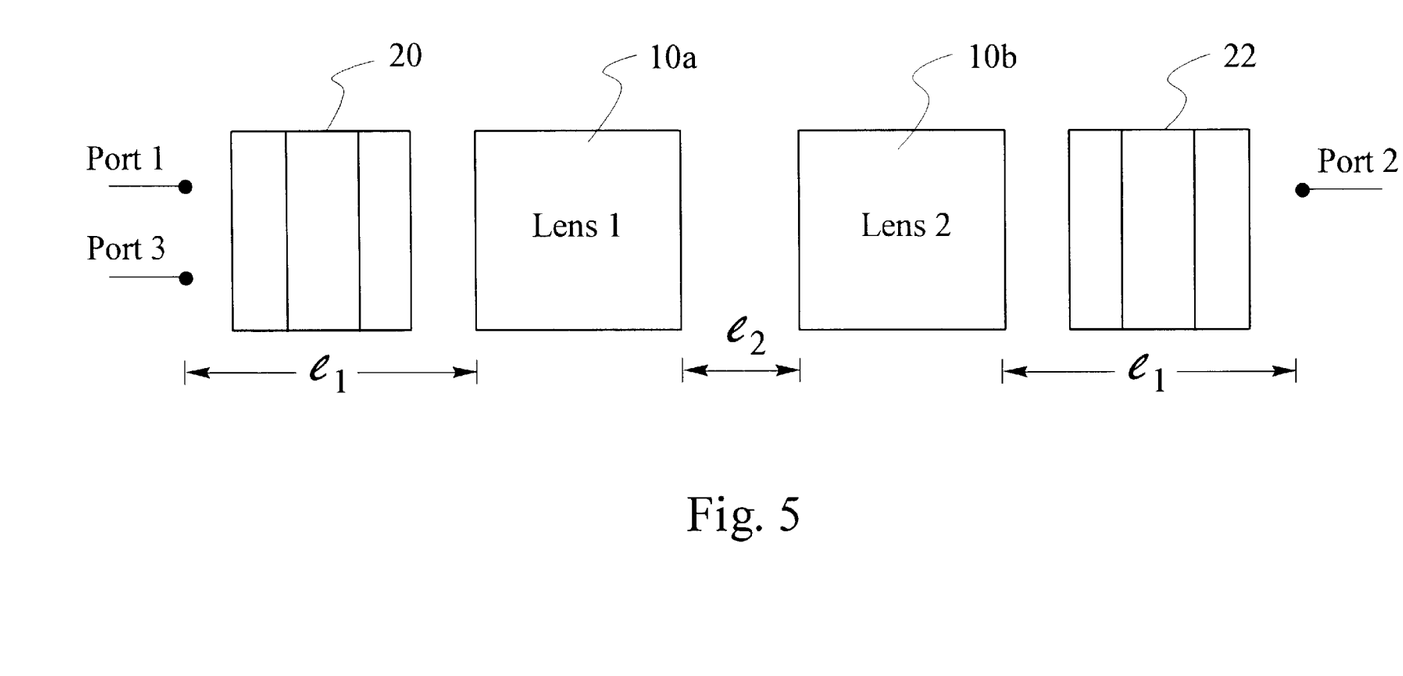
FIG. 5 is a side view of an arrangement of a pair of back to back spaced GRIN lenses having input/output waveguides positioned offset from the optical axes of the lenses an including optical elements disposed between the lenses and input waveguides, in accordance with this invention.

FIG. 5 shows an embodiment wherein an optical circulator is shown having 2 waveguides in the form of optical fibers parallel and adjacent one another indicated as port 1 and port 3. Optical elements 20 and 22 each comprise well known circulating components in the form of polarization rotation means disposed between two birefringence crystals arranged such that light from port 1 will be received by port 2 and light from port 2 will be received by port 3. By using this arrangement very small optical elements can be used thereby significantly reducing the cost of the device.

What is claimed is:

1. An optical device comprising:

two lenses, each lens having an at least substantially collimating end face and a substantially focusing end face;

an optical element coupled with at least one of the two lenses;

a waveguide adjacent at least each of the two lenses for launching light to or from a respective adjacent lens, the waveguides each having an end that is separated from its adjacent lens by an optical distance of approximately $d_1$, an optical distance between the two substantially collimating end faces of the at least two lenses being d2, where $d_1$ is approximately equal to one half of $d_2$, and wherein $d_1 > 0$.

2. An optical device as defined in claim 1, wherein the at least collimating ends are inwardly facing and the at least focusing ends are outwardly facing.

3. An optical device as defined in claim 1, wherein the two lenses are substantially coaxial.

4. An optical device as defined in claim 1, wherein the two lenses are GRIN lenses.

5. An optical device as defined in claim 1, wherein the optical element is disposed between the two lenses.

6. An optical device as defined in claim 1, wherein the optical element is disposed between one of the waveguides and one of the lenses.

7. An optical device as defined in claim 1, wherein the lenses are substantially less than quarter pitch lenses.

8. An optical device comprising:

two lenses, each having an at least substantially collimating end face and a substantially focusing end face;

an optical element coupled with at least one of the two lenses;

a waveguide adjacent to and spaced from each of the two lenses for launching light to or from a respective adjacent lens, the waveguides each having an end that is separated from its adjacent lens by an optical distance of approximately $d_1$, an optical distance between the two substantially collimating end faces of the at least two lenses being $d_2$, where $d_1$ is approximately equal to one half of $d_2$, and wherein $d_1>0$.

9. An optical arrangement device an input waveguide having an input end face, an output waveguide having an output end face, a first GRIN lens, a second GRIN lens, the input end face of the waveguide facing and being spaced an optical distance $d_1$ from the first GRIN lens, and the end face of the output waveguide facing and being spaced an optical distance $d_2$ from the second GRIN lens, the first and second GRIN lenses being spaced apart such that the optical distance between inwardly facing faces of the first and second GRIN lenses is approximately equal to $d_1+d_2$.

10. An optical device as defined in claim 9, further comprising an additional optical element disposed between the input and output waveguides.

11. An optical device as defined in claim 10, wherein the additional optical element is disposed between the first and second GRIN lenses.

12. An optical device as defined in claim 9, wherein the additional optical element includes and optical isolator.

13. An optical device as defined in claim 11, wherein the first and second GRIN lenses are substantially coaxial.

14. An optical device as defined in claim 13, wherein the first and second GRIN lenses are substantially the same, and oriented back to back such that inwardly facing end faces are similar.

15. An optical device as defined in claim 14, wherein the input and output waveguides have optical axes that are parallel to and offset from the optical axis of the substantially coaxial GRIN lenses.

16. An optical device as defined in claim 1, including at least a further waveguide adjacent each of the two lenses for providing an additional, different path for launching and receiving light therealong.

17. An optical device as defined in claim 16, including means for launching two separate beams into the device and for receiving two separate launched beams of light launched into the device.

18. An optical device as defined in claim 16, wherein the optical element coupled with at least one of the two lenses includes a polarization rotation means sandwiched between two birefringence crystals.

19. An optical device as defined in claim 17, including an additional optical element, the optical elements each being optically coupled with one of the two lenses and each including a polarization rotation means sandwiched between two birefringence crystals for circulating optical signals launched into the device between three ports.

20. An optical device as defined in claim 1, wherein the element comprises and isolator.

* * * * *

UNITED STATES PATENT AND TRADEMARK OFFICE
CERTIFICATE OF CORRECTION

PATENT NO. : 5,850,493
DATED : December 15, 1998
INVENTOR(S) : Cheng

It is certified that error appears in the above-identified patent and that said Letters Patent is hereby corrected as shown below:

Title page,
Showing the illustrative figure, should be deleted and substitute therefor the attached title page.

Drawings,
Sheet 1 should be replaced with the attached sheet containing Figs. 1a, 1b and 1c.
Sheet 2 should be replaced with the attached sheet containing Figs. 2a and 2b.
Sheet 3 should be replaced with the attached sheet containing Figs. 3 and 4.
Sheet 4 should be replaced with the attached sheet containing Fig. 5.

Column 1,
Line 38, "dempultiplexing" should read -- demultiplexing --;
Line 42, "dichoric" should read -- dichroic --

Column 3,
Line 3, "an" should read -- and --;
Line 8, "an" should read -- and --;
Line 14, "an" should read -- and --;
Line 49, "waveguide 11" should read -- waveguide 11a --;
Line 64, "$I_3$" should read -- $d_3$ --;
Line 65, "$I_1$" should read -- $d_1$ --;
Line 67, "$I_2$" should read -- $d_2$ --

Column 4,
Line 4, "$I_1 \approx I_2 \approx 0.5 I_3$" should read -- $d_1 \approx d_2 \approx 0.5\ d_3$ --;
Line 5, please insert -- In some instances, when the optical distance is substantial, then the pitch of the lenses is chosen to be substantially less than a quarter pitch. --;
Line 8, "2d" should read -- $2d_1$ --;
Line 10, "d" should read -- $d_1$ --;
Line 10, "element" should read -- element 18 --

Claim 9,
Line 11, insert the word -- comprising -- after "device";
Line 18, "lenses" should read -- lens --;
Line 20, "lenses" should read -- lens --

UNITED STATES PATENT AND TRADEMARK OFFICE
CERTIFICATE OF CORRECTION

PATENT NO. : 5,850,493
DATED : December 15, 1998
INVENTOR(S) : Cheng

It is certified that error appears in the above-identified patent and that said Letters Patent is hereby corrected as shown below:

Claim 10,
Line 23, "waveguides" should read -- waveguide --

Claim 11,
Line 26, "lenses" should read -- lens --;

Claim 12,
Line 28, "and" should read -- an --;
Line 30, "lenses" should read -- lens --

Claim 14,
Line 6, "waveguides" should read -- waveguide --

Claim 15,
Line 6, "waveguides" should read -- waveguide --

Claim 19,
Line 25, "birefringence" should read -- birefringent --

Claim 20,
Line 28, "and" should read -- an --;
Line 28, insert the word -- optical -- before "isolator"

Signed and Sealed this

Twenty-seventh Day of November, 2001

Attest:

NICHOLAS P. GODICI
Attesting Officer   Acting Director of the United States Patent and Trademark Office

United States Patent [19]

Cheng

[11] Patent Number: 5,850,493
[45] Date of Patent: Dec. 15, 1998

[54] DEVICE FOR FOCUSING LIGHT THROUGH AN OPTICAL COMPONENT

[76] Inventor: Yihao Cheng, 36 Meadowbreeze Drive, Kanata, Ontario, Canada, K2M 2L6

[21] Appl. No.: 896,540

[22] Filed: Jul. 18, 1997

[51] Int. Cl.⁶ .................................. G02B 6/32
[52] U.S. Cl. ............................................ 385/34
[58] Field of Search ........................ 385/27, 31, 32, 385/33, 34, 35, 39, 51, 74, 147

[56] References Cited

U.S. PATENT DOCUMENTS

| | | | |
|---|---|---|---|
| 4,946,239 | 8/1990 | Gannon | 385/43 |
| 5,117,473 | 5/1992 | Pan | 385/33 |
| 5,177,803 | 1/1993 | Newhouse et al. | 385/33 |
| 5,371,816 | 12/1994 | Pan | 385/33 |
| 5,546,180 | 8/1996 | Garel-Jones et al. | 356/73.1 |
| 5,719,973 | 2/1998 | Monroe et al. | 385/34 |

*Primary Examiner*—Akm E. Ullah
*Attorney, Agent, or Firm*—Neil Teitelbaum & Associates

[57] ABSTRACT

An optical device comprising an optical element optically coupled with at least two lenses, each lens having at least a substantially collimating end, the at least substantially collimating ends being inwardly facing one another and each lens having a substantially focusing end, the substantially focusing ends being outwardly facing, and at least one waveguide disposed adjacent and spaced from the each outwardly facing end for coupling light to or from an adjacent lens, the waveguides each having an end that is separated from its adjacent lens by an optical distance of approximately d1, an optical distance between the two collimating end faces of the at least two lenses being d2, where d1 is approximately equal to one half d2.

20 Claims, 4 Drawing Sheets

PRIOR ART

Fig. 1a

PRIOR ART

Fig. 1b

PRIOR ART